(12) United States Patent
Hookman

(10) Patent No.: US 6,603,611 B1
(45) Date of Patent: Aug. 5, 2003

(54) MOUNT FOR ULTRA-HIGH PERFORMANCE OF OPTICAL COMPONENTS UNDER THERMAL AND VIBRATIONAL DISTORTION CONDITIONS

(75) Inventor: Robert A. Hookman, Fort Wayne, IN (US)

(73) Assignee: ITT Manufacturing Enterprises, Inc., DE (US)

( * ) Notice: Subject to any disclaimer, the term of this patent is extended or adjusted under 35 U.S.C. 154(b) by 0 days.

(21) Appl. No.: 09/985,928

(22) Filed: Nov. 6, 2001

(51) Int. Cl.$^7$ ................................................. G02B 7/02
(52) U.S. Cl. ........................ 359/811; 359/819; 359/822
(58) Field of Search ................................ 359/811, 819, 359/822

(56) References Cited

U.S. PATENT DOCUMENTS

| | | | | |
|---|---|---|---|---|
| 3,704,658 A | * | 12/1972 | Uesugi | 359/813 |
| 3,989,358 A | * | 11/1976 | Melmoth | 359/813 |
| 4,863,243 A | | 9/1989 | Wakefield | 359/896 |
| 4,880,301 A | | 11/1989 | Gross | 359/874 |
| 5,526,192 A | * | 6/1996 | Imura et al. | 359/703 |
| 6,262,853 B1 | * | 7/2001 | Takanashi et al. | 359/822 |
| 6,411,448 B2 | * | 6/2002 | Takanashi et al. | 359/822 |

OTHER PUBLICATIONS

Max Born, et al.; *Principles of Optics, Sixth Edition*; pp. 300–301.

*Selected Papers on Optomechanical Design;*SPIE vol. 770; 1988; pp. 146, 147, 248, 249, 303,324 and 325.

Alan D. Bell, et al.; *Vibration Stable, Ultra–Precision Adjustment Mono–Ball Mechanism*; Proceedings of SPIE, vol. 4093; Aug. 2000; pp. 226–236.

Daniel Vukobratovich; *Introduction to Opto–Mechanical Design*; 1986; p. 200.

Paul R. Yoder, Jr.; *Opto–Mechanical Systems Design, Second Edition*, 1993; pp. 306–320.

* cited by examiner

*Primary Examiner*—Ricky Mack
(74) *Attorney, Agent, or Firm*—Edell, Shapiro & Finnan, LLC

(57) ABSTRACT

A mount includes a plurality of flexures disposed on a frame in pairs for securing an optical component to the frame. A first pair of flexures is disposed along a first axis that intersects a center of the optical component, and a second pair of flexures is disposed along a second axis that intersects the center of the optical component. Each of the flexures is flexible in a direction substantially perpendicular to the flexure and allows movement of the optical component in the same direction as the axis upon which each flexure is disposed. Each flexure is further substantially rigid in all directions non-parallel the direction of the axis upon which each flexure is disposed. The alignment of pairs of flexures in this configuration minimizes the adverse effects of extreme vibrational and thermal distortions on the flatness of the optical component.

24 Claims, 8 Drawing Sheets

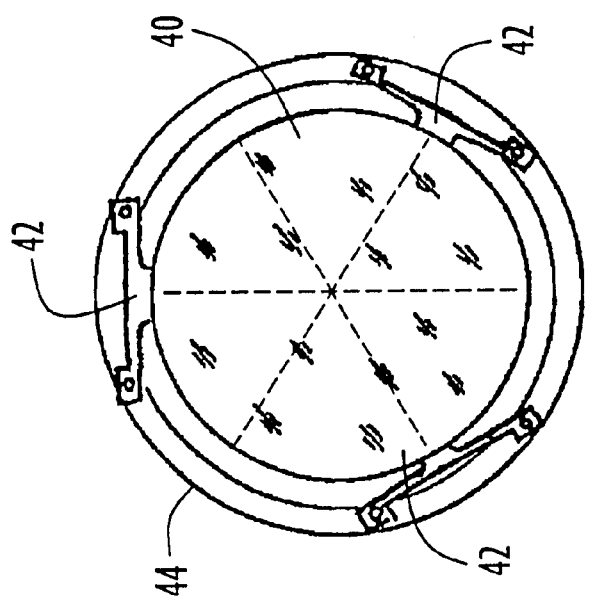
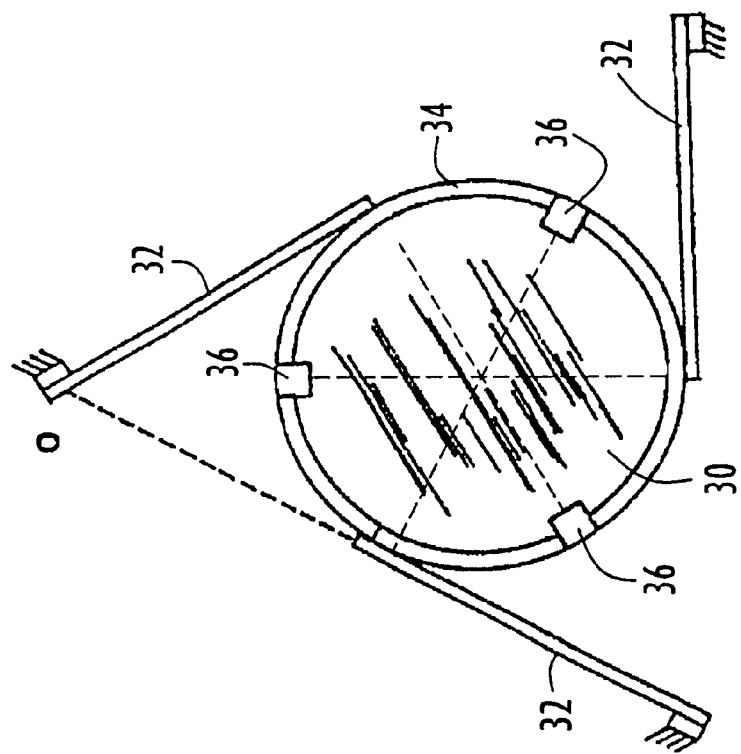
FIG.1b
PRIOR ART
FIG.1a
PRIOR ART

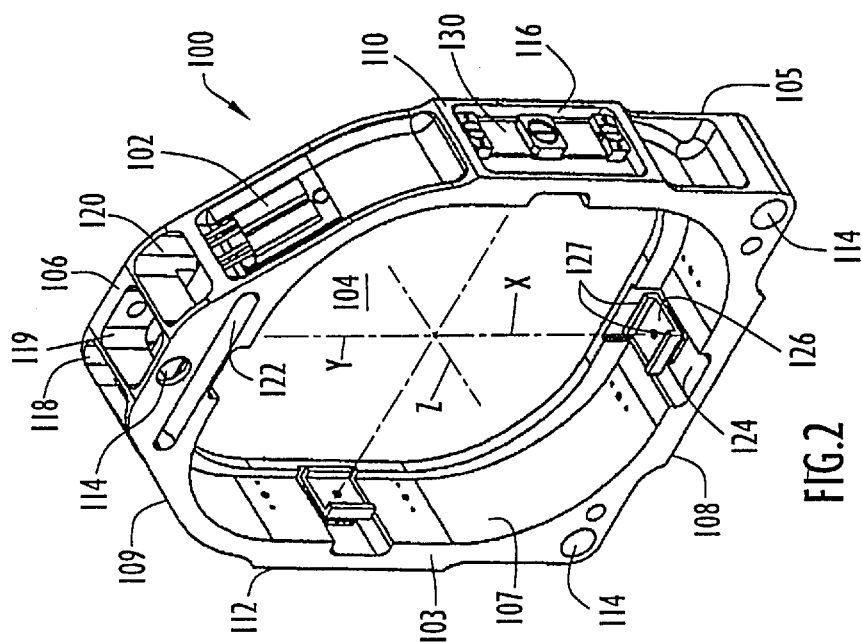
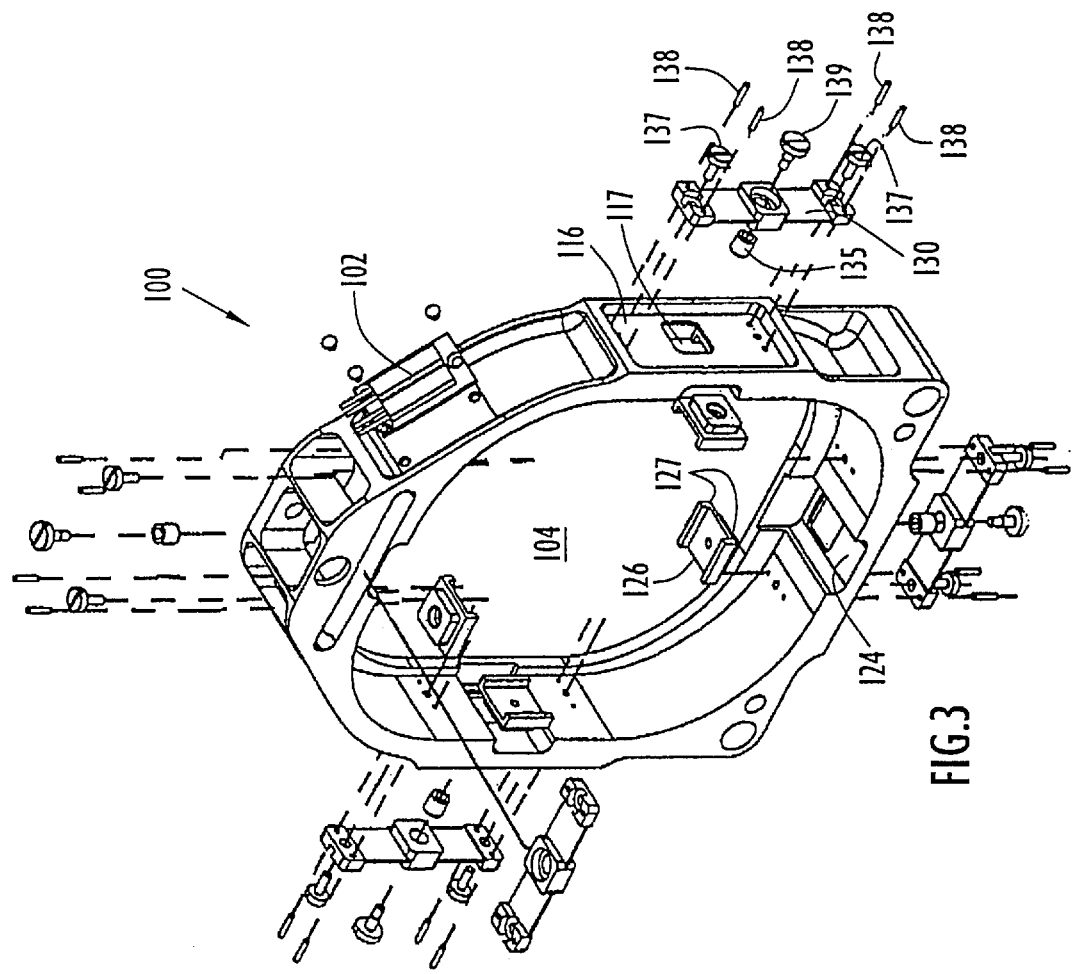

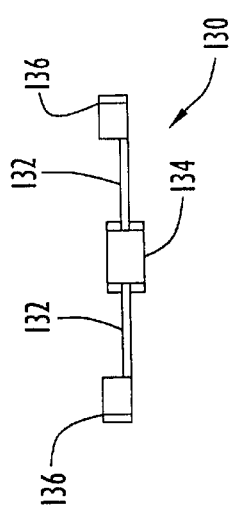
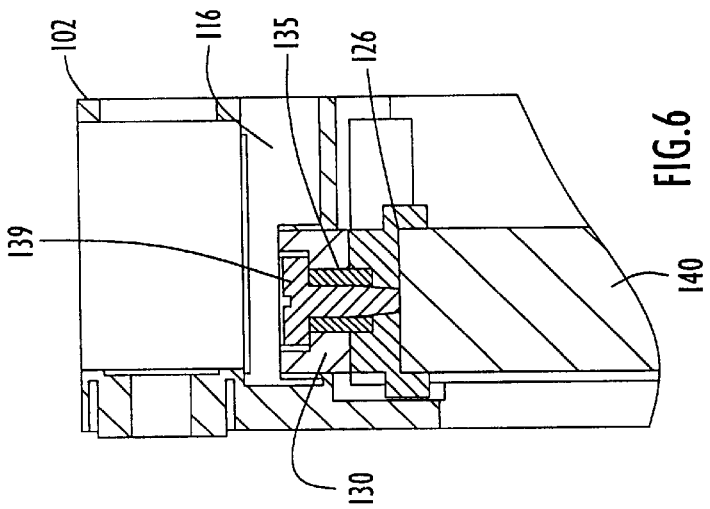
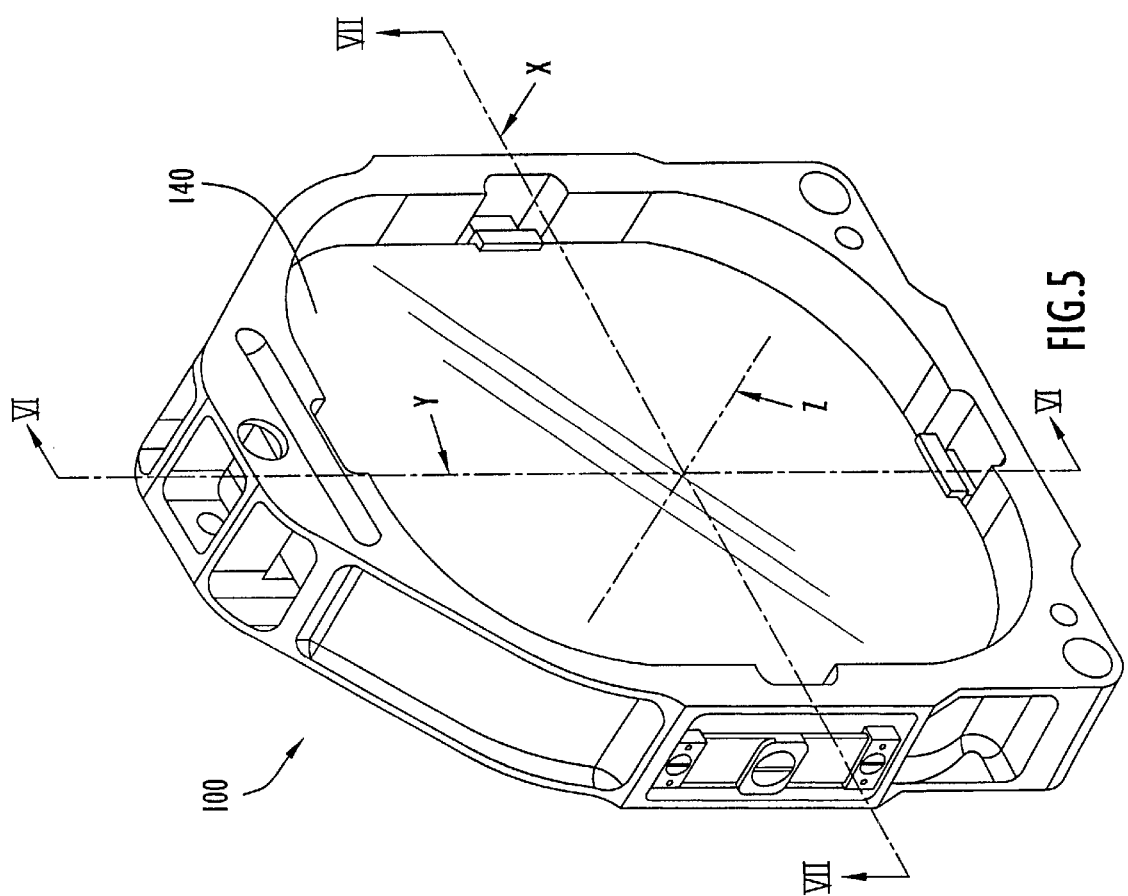

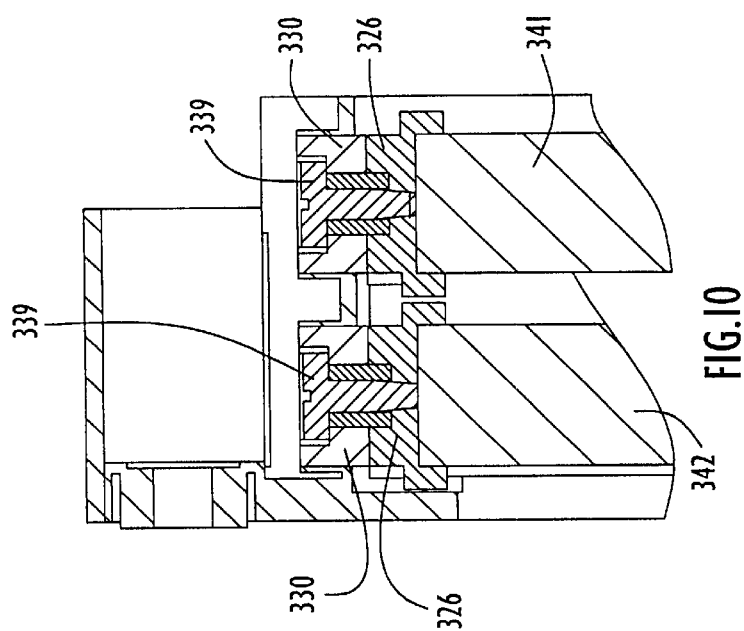
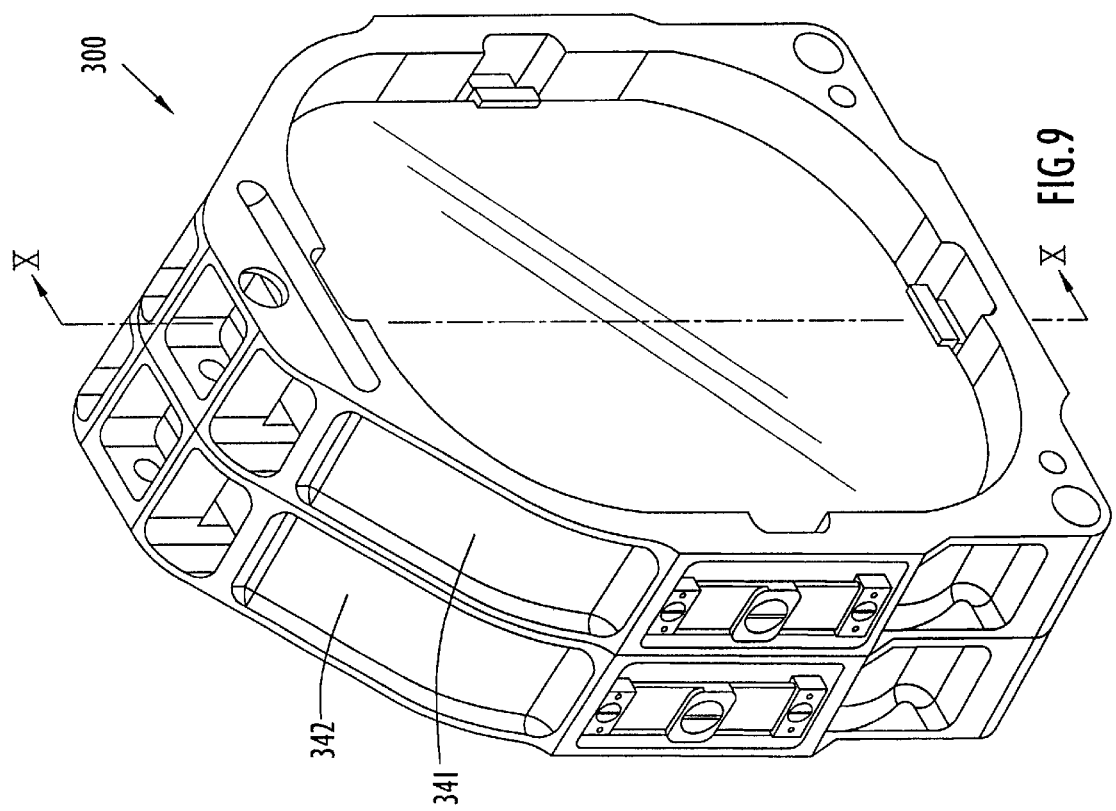

MOUNT FOR ULTRA-HIGH PERFORMANCE OF OPTICAL COMPONENTS UNDER THERMAL AND VIBRATIONAL DISTORTION CONDITIONS

GOVERNMENT INTERESTS

This invention was made with Government support and the Government may have certain rights in the invention.

BACKGROUND OF THE INVENTION

1. Field of the Invention

The present invention relates to optical components and instruments. More particularly, it relates to a mount for an optical component.

2. Description of the Related Art

In many optical instrument designs, mounts are employed to secure certain optical components at precise positions with respect to other optical components within the instrument in order to ensure optimal performance of the optical instrument. A beamsplitter is one such optical component that in certain applications must be aligned at a precise position within an instrument. Examples of conventional optical instruments employing beamsplitters are Michelson-type transform spectrometers, Michelson interferometers and laser range finder/designator (LRF/D) systems. If the beamsplitter is not aligned within a precise range in each of those systems, light beams that are divided by the beam splitter will in turn be out of alignment with respect to other components resulting in inadequate performance of the instrument.

A variety of different designs for mounting optical components in instruments are known in the art. Some optical component mounts are based upon securing the optical component on an adhesive silicone tip or layer. However, the adhesive condition and resulting performance of the mount can change over extended periods of time. Mount designs that are more reliable for critical optical components over extended periods of time and under severe conditions are based upon the use of metal clips and flexure supports. The flexure supports provide a resilient connection for the optical component to a support structure.

Conventional optical component mounts utilizing a clip and flexure mount employ a three-point mount design. Two conventional three-point flexure mounts for a circular optical component are illustrated in FIGS. 1a and 1b. In both designs, the three-point flexure mount includes flexures that are circumferentially spaced from each other by about 120°. In the mount design depicted in FIG. 1a, flexures 32 are secured to an outer surface of a frame 34, and an optical component 30 is in turn secured to frame 34 at three clip points 36. In the mount design of FIG. 1b, the optical component 40 is secured to three flexures 42, and flexures 42 are in turn secured to an inside surface of a frame 44. Each flexure in the three-point flexure mount design depicted in FIGS. 1a and 1b provides a direction or line of freedom for movement of the optical component as indicated by the dashed lines in those figures. Each line of freedom extends perpendicular to the flexure to which it relates. In the examples illustrated in FIGS. 1a and 1b, the lines of freedom intersect at the center of the circular optical component. The intersection of the lines of freedom is referred to as the stationary point for the optical component, which is a point on the optical component that remains substantially fixed despite thermal expansion or vibratory movement of the optical component. The three-point flexure mount design works well for optical components having a circular configuration, and accordingly have been used extensively as the preferred type of mount.

Because of their prevalent use, three-point flexure mount designs are also utilized for optical components having noncircular geometric configurations. A conventional mount design for a generally rectangular shaped optical component is illustrated in FIG. 1c. The mount design includes a frame 54 secured to a base plate 56, with one flexure 52 aligned at one end of the frame and two flexures 53 aligned at the corners of an opposing end of the frame. Optical component 50 is secured within the frame 54. As indicated by the dashed lines of FIG. 1c, the lines of freedom allowed by the three flexures intersect to form a stationary point at a location removed from the center of the optical component.

While three-point mount designs may perform adequately in certain environments when the size of the optical component is small, the performance of such mounts degrades considerably when larger optical components are utilized and severe thermal and vibrational conditions exist. For example, three-point mount designs have been found to be unsuitable for maintaining appropriate alignment of a large optical component such as a beamsplitter in an instrument secured within a satellite or other aerospace vehicle subjected to typical harsh launch conditions. Additionally, devices utilized in the semiconductor and related industries for manufacturing micro-components requiring a high degree of manufacturing precision can degrade in performance when using three-point optical component mounts in applications where the devices are exposed to high temperature changes and/or vibrations. The flexures, when configured in the mount of FIG. 1c, are incapable of preventing the optical component from undergoing distortion and ensuring a sufficient optical flatness for maintaining a desired performance level. This problem is especially prevalent for the conventional rectangular mount depicted in FIG. 1c, where the stationary point of the three-point flexure mount is located away from the center of the optical component. While the flexures of these mounts may be stiffened, e.g., to survive vibration levels associated with a typical launch, thermal variations (i.e., temperature changes of more than 80° C.) associated with the launch will create an undesirable flatness distortion in the optical component due to the thermal expansion of the optical component and/or supporting structure. In certain aerospace applications, e.g., a flatness distortion of only as much as about 0.1 microinch is allowable. Conventional three-point flexure mounts have not been able to maintain such a flatness tolerance under extreme temperature and vibrational conditions. In addition, conventional three-point flexure mounts for large, non-circular optical components can lead to a gravity sag at the unsupported portions of the component between the flexure mounts.

A further problem associated with conventional optical component mount designs is that they typically occupy a large area and are unsuitable for aerospace instrument designs that require strict size and mass limitations.

Thus, there is a need for an optical component mount that sufficiently maintains the alignment and flatness of the optical component within an instrument with a high degree of precision while under severe thermal and vibrational conditions. Further, there is a need for an optical component mount that is configured to occupy an area suitable for a particular application.

OBJECTS AND SUMMARY OF THE INVENTION

Therefore, in light of the above, and for other reasons that become apparent when the invention is described, an object of the present invention is to mount an optical component securely within an instrument so as to ensure a desired performance level of the optical component under severe thermal and vibrational distortion conditions.

Another object of the present invention is to minimize flatness distortion exerted on the optical component during exposure to such severe thermal and vibrational distortion conditions.

A further object of the present invention is to securely mount the optical component within the instrument utilizing a mount having a small size and mass suitable for aerospace or other applications.

Yet another object of the present invention is to provide an effective mount design capable of securing multiple optical components within an instrument.

The aforesaid objects are achieved individually and in combination, and it is not intended that the present invention be construed as requiring two or more of the objects to be combined unless expressly required by the claims attached hereto. In accordance with the present invention, a mount for ultra-high performance of optical components subjected to severe thermal and vibrational distortion conditions is provided. The mount includes a first pair of supports each disposed along a first axis intersecting a center of the optical component, where the supports of the first pair couple with the optical component and are movable in a direction of the first axis. The mount further includes a second pair of supports each disposed along a second axis intersecting the optical center of the optical component, where the supports of the second pair couple with the optical component and are movable in a direction of the second axis. Each of the supports of the first pair are substantially rigid in directions non-parallel the first axis, and each of the supports of the second pair are substantially rigid in directions non-parallel the second axis The supports thus limit the freedom of movement of the optical component around a stationary point located at about the center of the optical component.

The above and still further objects, features and advantages of the present invention will become apparent upon consideration of the following detailed description of a specific embodiment thereof, particularly when taken in conjunction with the accompanying drawings wherein like reference numerals in the various figures are utilized to designate like components.

BRIEF DESCRIPTION OF THE DRAWINGS

FIG. 1a is a view in elevation of a conventional three-point flexure mount for a circular optical element.

FIG. 1b is a view in elevation of another conventional three-point flexure mount for a circular optical element.

FIG. 2 is a view in perspective of a mount for an optical component in accordance with certain aspects of the present invention.

FIG. 3 is an exploded view in perspective of the mount of FIG. 2.

FIG. 4 is a view in elevation of a flexure blade utilized with the mount of FIG. 2.

FIG. 5 is a view in perspective of the mount of FIG. 4 with an optical component secured within the mount.

FIG. 6 is an elevated view in section of a portion of the mount with optical component secured therein taken along lines VI—VI of FIG. 5.

FIG. 9 is a view in perspective of another alternative embodiment of a mount with an optical component secured within the mount in accordance with certain aspects of the present invention.

FIG. 10 is an elevated view in section of a portion of the mount with optical component taken along lines X—X of FIG. 9.

DETAILED DESCRIPTION OF THE PREFERRED EMBODIMENTS

Figure 1C:
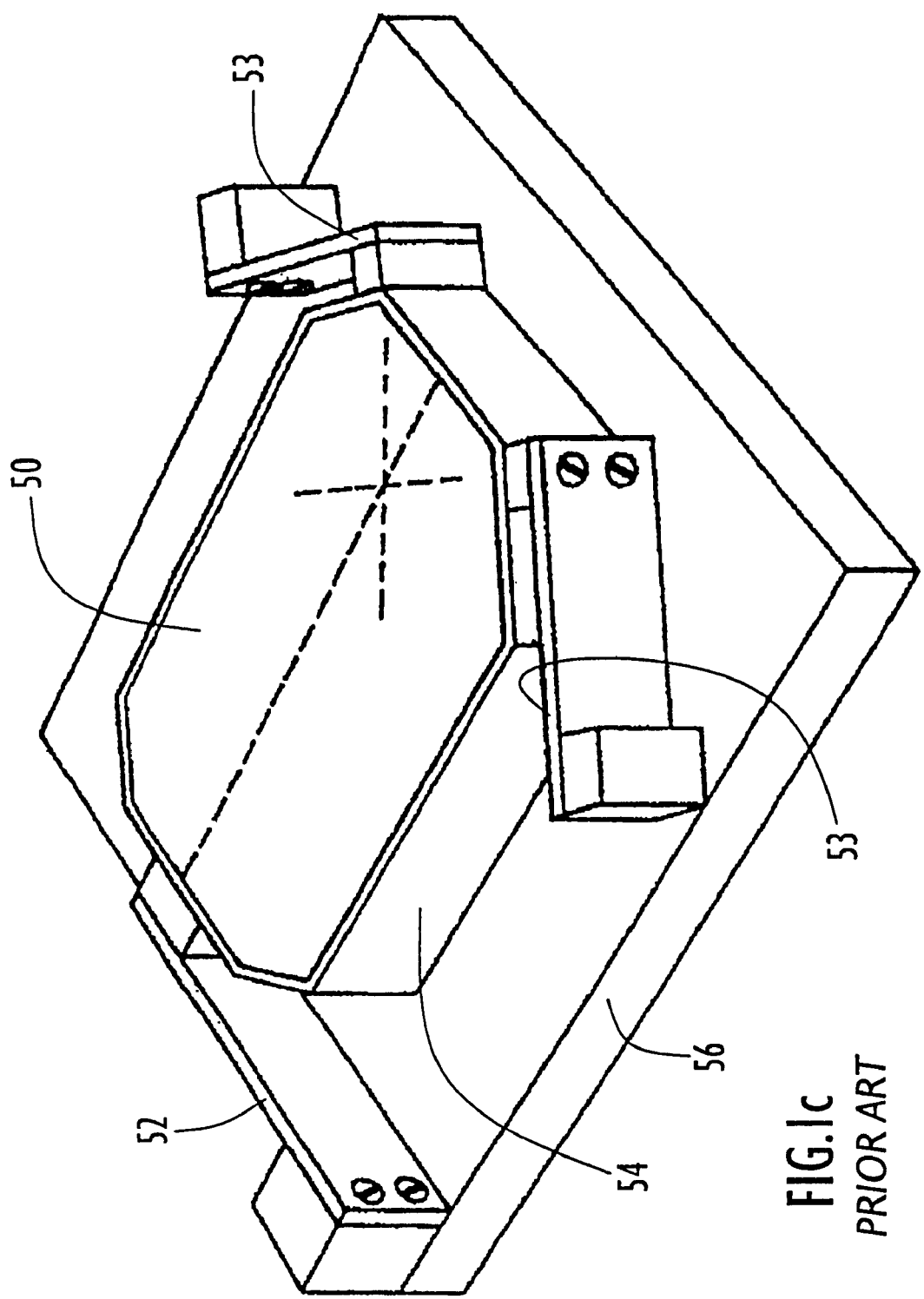
FIG. 1c is a view in perspective of a conventional three-point flexure mount for a noncircular optical element.

In accordance with certain aspects of the present invention, a mount for an optical component is illustrated in FIGS. 2–7. An exemplary optical component for securing within the mount of the present invention is a beamsplitter. However, it is noted that the optical component may be a lens, a mirror or any other element utilized in an optical instrument or other device that requires precise positioning of the component throughout the operation of the device. Referring to FIG. 2, a mount includes a generally rectangular shaped frame 100 having a front surface 103 and an opposing rear surface 105, an interior side surface 107 and an opposing exterior side surface 109. The interior and exterior side surfaces extend between the front and rear surfaces and along the respective interior and exterior boundaries of the frame. A generally rectangular shaped aperture 104 is defined within the frame between the enclosed boundary formed by interior side surface 107. The frame aperture extends through the frame between the front and rear surfaces and is suitably dimensioned to receive and retain a generally rectangular shaped optical component 140 (see FIG. 5). Exterior side surface 109 of frame 100 includes an upper flat portion 106, a lower flat portion 108 that opposes the upper flat portion, and opposing side flat portions 110, 112. The frame may be constructed of any material (e.g., metal or plastic) having a weight and rigidity suitable for thermal, vibrational and other related conditions associated with a particular application for the mount. An exemplary material for the mount frame suitable for use in aerospace applications is beryllium. One or more thermal sensors optionally may be provided on the frame to measure thermal gradients in the environment to which the optical element secured within the frame is exposed. Referring to FIG. 3, a thermal sensor 102 is secured to exterior side surface 109 of frame 100.

A pair of mounting apertures 114 extend through frame 100 between front surface 103 and rear surface 105 at the bottom corners of the frame on either side of lower flat portion 108. Another mounting aperture 114 extends through the frame between the front and rear surfaces at upper flat portion 106. The frame may be secured within the instrument by inserting suitable fasteners (e.g., bolts) through the three mounting apertures and securing the fasteners to a suitable support structure within the instrument.

Each of the lower and side flat portions includes a generally rectangular recess 116 to receive and retain a flexure blade 130 on the exterior side surface of the frame as described below. Each recess 116 includes a rectangular aperture 117 located at about the center of the recess that extends through the frame between the interior and exterior side surfaces and communicates with frame aperture 104. The upper flat portion includes a central recess 119 with two recesses 118, 120 disposed on either side of the central recess. The three recesses at the upper flat portion communicate with a slit 122 extending from front surface 103 into the frame. Slit 122 is located below mounting aperture 114 on the frame front surface and is dimensioned to fully receive and retain a flexure blade 130 while permitting a fastener to extend through mounting aperture 114. Recess 119, which is generally centered with slit 122, also includes a rectangular aperture (not shown) that extends through the interior side surface of the frame and communicates with frame aperture 104. Recesses 118 and 120 disposed on either side of recess 119 are aligned with opposing longitudinal ends of the slit. As further described below, recess 119 provides access to the central portion of a flexure blade disposed within the slit for securing the flexure blade to a clip 126, whereas recesses 118, 120 provide access to the longitudinal ends of the flexure blade within the slit for securing the flexure blade to the frame.

Interior side surface 107 includes recesses 124 that are aligned with the exterior surface flat portions and the rectangular apertures located at those flat portions. The interior side surface recesses are further dimensioned to receive and retain mounting clips 126 for securing an optical component within the frame as described below.

Referring to FIG. 4, each flexure blade 130 includes a pair of generally rectangular flat sections 132 separated at their facing ends by a rectangular central securing member 134. The flat sections are very thin and have a suitable resiliency for providing flexure characteristics to the flexure blade as described below. The other ends of the flat sections are connected to rectangular distal securing members 136. Each of the distal securing members of the flexure blades includes a bore for receiving a fastener 137 (e.g., a screw) to secure the flexure blade within a respective recess or slit of a frame flat portion. Referring to FIG. 3, a pair of smaller bores are also disposed on each distal securing member for receiving a smaller fastener 138 (e.g., a pin) to further secure the distal ends of the flexure blade to the frame. The central securing member of each flexure blade is aligned to correspond with and be partially received within the rectangular aperture disposed at the recess of a corresponding flat portion on the frame. Each central securing member further includes a bore to receive a fastener 139 (e.g., a screw) for securing a corresponding clip 126 to the flexure blade as described below. A bushing 135 is secured around each fastener 139 between the central securing member and the clip to absorb any shear forces that would otherwise be imparted to the fastener under extreme vibrational conditions. Alternatively, for applications in which vibrational conditions are of less concern, the bushings may be removed from the fasteners without significantly affecting the operability of the mount for those applications.

Each clip 126 of mount 100 has a generally rectangular configuration and includes a bore to receive and engage a corresponding fastener 139 inserted through central securing member 134 of a corresponding flexure blade 130. The clips are suitably dimensioned to fit within recesses 124 of internal side surface 107 and to be partially received within the apertures disposed at the corresponding flat portions of the exterior side surface. A pair of arms 127 extend from an engaging surface and at opposing sides of each clip and are separated a distance that is slightly larger than the thickness of optical component 140. Each of the clips is secured to an edge of the optical component by inserting the optical component edge between the arms of the clip. The optical component may further be secured to the clips utilizing a suitable fastener or adhesive. Preferably, an epoxy is applied between the arms of each clip and the engaging edge of the optical component to firmly bond the clips to the optical component thus ensuring the optical component is firmly secured to the flexure blades within the frame.

The flexure blades may be constructed of any suitable material (e.g., stainless steel) that allows resilient flexure in a direction substantially perpendicular to the thin, flat sections of the blades in response to a force applied to the blades when secured to the frame. The dimensions of the flexure blades, including the thickness of the flat sections, are preferably selected to resist flexure of each blade in any direction other than a direction substantially perpendicular to the opposing surfaces of the flat sections. The flexure blades are aligned in pairs to limit the freedom of movement of an optical component 140 secured to the flexure blades and mounted within the frame along selected axes. Specifically, the flexure blades are arranged along the exterior surface of the frame with the flat sections of the blades adjacent the frame. The central securing member of each flexure blade is also aligned with and opposes the central securing member of a corresponding flexure blade of a pair on the frame such that an imaginary line intersecting the two central securing members of the pair of blades also intersects the center of an optical component secured within the frame. Preferably, the center of the optical component is the optical center of the optical component, which typically is the geometric center of the optical component. In frame 100 shown in FIGS. 2–7, flexure blades 130 of a first pair of flexures are secured within recesses 116 of flat side portions 110, 112, whereas flexure blades 130 of a second pair of flexures are secured within the recess of lower flat portion 108 and slit 122 of upper flat portion 106. The central securing members for the flexure blades secured at side flat portions 110, 112 are aligned along an imaginary horizontal axis X, shown in FIG. 2, whereas the central securing members for the flexure blades secured at upper flat portion 106 and lower flat portion 108 are aligned along an imaginary vertical axis Y. The X and Y axes are perpendicular with respect to each other and intersect at about the center of the optical component 140 mounted within the frame.

By arranging pairs of flexure blades in the manner described above, a stationary point is established that is at or near the center of the optical component. The stationary point is a geometric location on the optical component at which the lines of freedom (i.e., the movable directions allowed by the flexure blades) intersect. The stationary point of the optical component further remains fixed at the same geometric location within the frame despite thermal expansion of the optical component or vibrational forces acting on the optical component.

Referring to FIGS. 2 and 5, the pair of flexure blades mounted at side flat portions 110, 112 allow movement of the optical component along the X axis but are rigid and substantially prevent movement of the optical component along the Y and Z axes. Thus, the X axis represents a line of freedom for the optical component established by the pair of flexure blades mounted at the side flat portions. In contrast, the pair of flexure blades mounted at upper and lower flat portions 106, 108 allow movement of the optical component along the Y axis but are rigid and substantially prevent movement of the optical component along the X and Z axes. The Y axis therefore represents another line of freedom for the optical component established by the pair of flexure blades mounted at the upper and lower flat portions. Thus, the stationary point for an optical component mounted within frame 100 lies at the intersection of the X and Y axes, which is substantially at the center of the optical component.

Figure 7A:
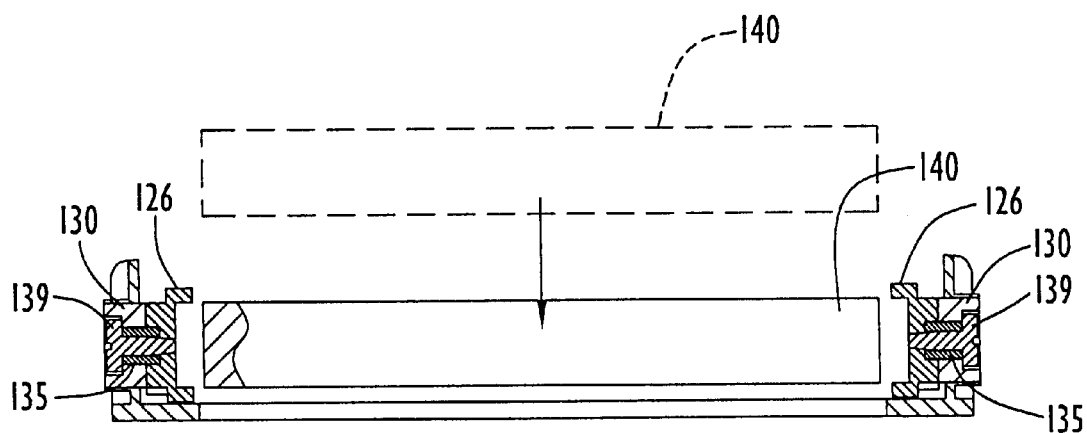
FIGS. 7a–7b are elevated views in section taken along lines VII—VII of FIG. 5 of the optical component being placed within the mount.
Figure 7B:
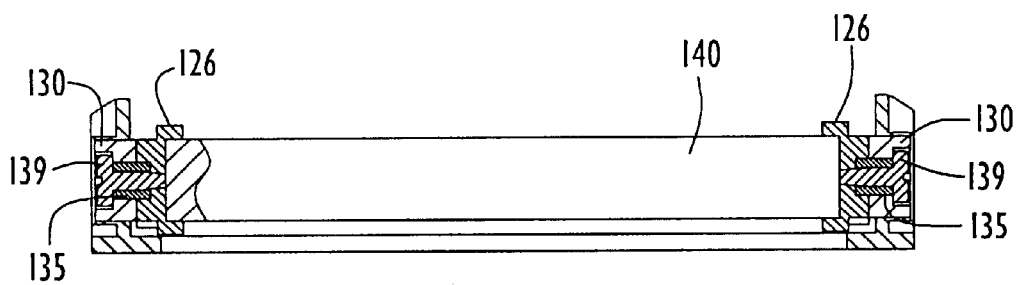

The mount design of the present invention facilitates easy assembly and securing of optical component 140 within frame 100. Flexure blades 130 are secured to the upper, lower and side flat portions of the frame exterior side surface by securing each distal securing member 136 of each flexure blade to a corresponding recess of a flat portion with fasteners 137, 138. As shown in FIG. 3, flexure blade 130 is secured to the frame at upper flat portion 106 by passing fasteners 137, 138 through recesses 118, 120. Clips 126 are then secured to their corresponding flexure blades utilizing fasteners 139 and bushings 135. Fastener 139 and bushing 135 are inserted into recess 119 to secure the clip to the flexure blade at the upper flat portion. Once the clips are secured to the flexure blades, optical component 140 is inserted into frame aperture 104 as illustrated in FIGS. 7a and 7b. The clips are pushed into recesses 124 and partially into the corresponding apertures aligned on those recesses to flex the flexure blades away from the frame exterior side surface. The flexure blades are maintained in the flexed position to provide an appropriate space to align the optical component edges between the arms of each clip. As described above, an epoxy is preferably applied to the engaging portion of each clip and/or the optical component prior to securing the optical component within each clip. The clips are then released to engage with an edge of the optical component. Once the epoxy is set, the mount is ready for use and may be secured within an instrument utilizing mounting apertures 114.

In operation, the mount design of the present invention maintains desired alignment and prevents undesirable flatness distortion of the optical component in environments including severe thermal fluctuations as well as vibrational forces (e.g., during a launch of a satellite). For example, when frame 100 is subjected to a distortional force component (e.g., due to thermal expansion of the optical component or severe vibrational forces exerted on the optical component) acting along imaginary axis X as illustrated in FIG. 5, the flexure blades mounted in the recesses of side flat surfaces 110, 112 allow flexibility of the optical component along the X axis while the combined flexure blades hold the optical component rigid in all other directions (i.e., along the Y and Z axes). Similarly, when the frame is subjected to a distortional force component acting along imaginary axis Y, the flexure blades mounted in the slit of upper flat surface 106 and the recess of lower flat surface 108 allow flexibility of the optical component along the Y axis while the combined flexure blades hold the optical component rigid in all other directions (i.e., along the X and Z axes). The flexures therefore limit any movement of the optical component to a substantially planar and radial manner with respect to the stationary point established at the center of the optical component (i.e., at the intersection of the X and Y axes). The mount design further provides a rigidity for the optical component that is suitable to withstand severe vibrational forces while also providing suitable flexibility to prevent flatness distortion that would otherwise be caused by thermal expansion of the frame and/or the optical element. In particular, the mount design maintains a flatness tolerance within 0.1 microinch when exposed to extreme vibrational and temperature fluctuations.

The mount design of the present invention may also secure multiple optical components within the frame while maintaining appropriate alignment and minimizing distortion of the components under severe thermal and vibrational conditions. Such multiple component mounts are useful, e.g., in interferometer designs requiring close alignment between a beamsplitter and one or more other optical components.

Figure 8:
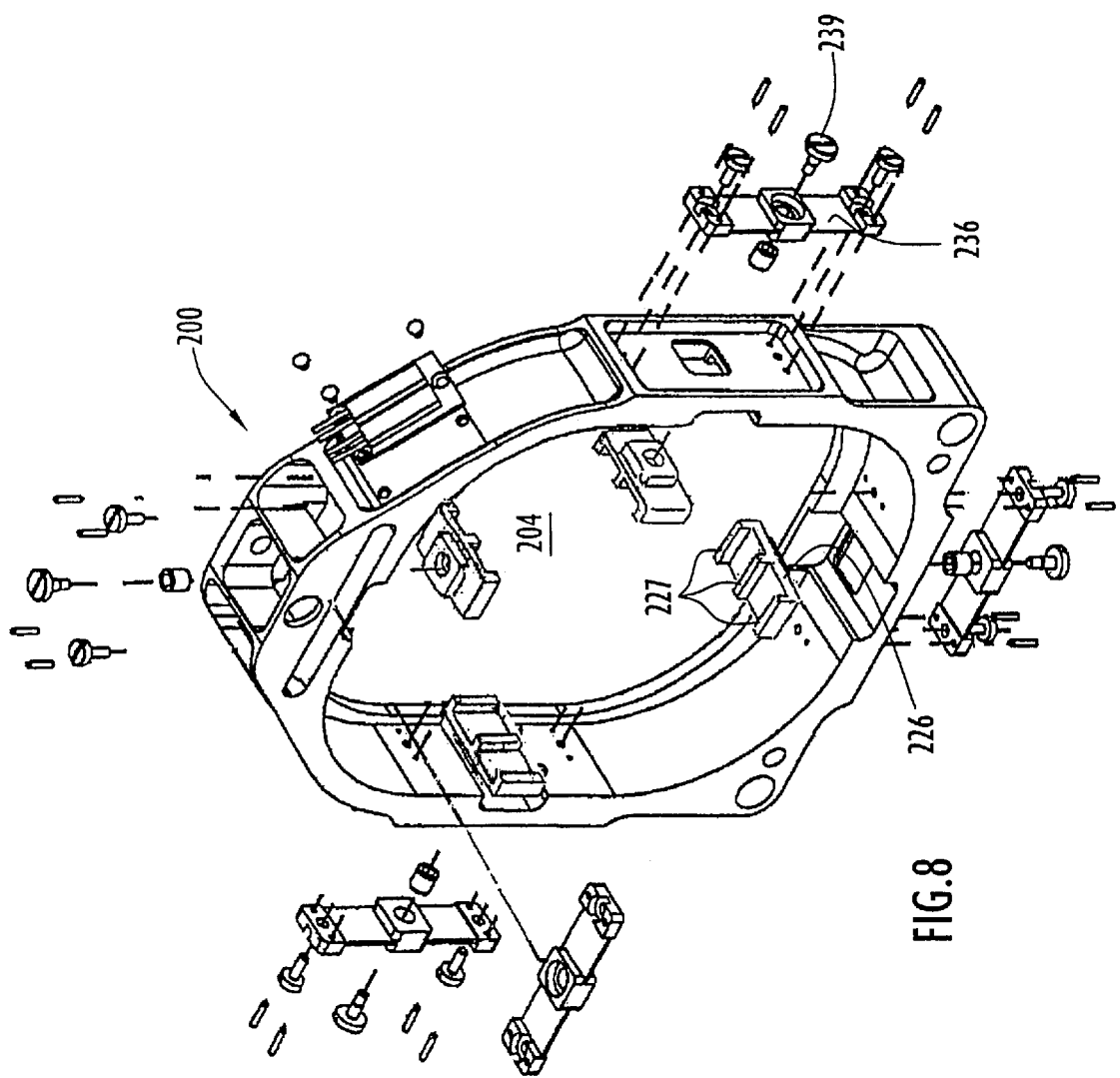
FIG. 8 is an exploded view in perspective of an alternative embodiment of a mount for an optical component in accordance with certain aspects of the present invention.

In an alternative mount design illustrated in FIG. 8, an optical component including multiple optical elements is secured within a frame utilizing opposing pairs of flexure blades. The mount is substantially similar to the mount described above and illustrated in FIGS. 2–7. However, the mount of FIG. 8 secures each of the optical elements to the pairs of flexures secured to the frame. Specifically, frame 200 includes opposing pairs of flexure blades 230 disposed at upper, lower and side flat portions on the exterior side surface of the frame, with clips 226 disposed on the interior side surface of the frame secured to the flexure blades with fasteners 239 in a substantially similar manner as in the embodiment described above. The thickness of frame 200 (i.e., the distance between the front and rear surfaces) is sufficient to accommodate dual optical elements within frame aperture 204. Additionally, clips 226 include three arms 227 extending from an engaging surface of each clip as opposed to the two-arm clips 126 of FIG. 3. Two of the arms 227 for each clip 226 are disposed at opposing ends of the clip, whereas the third arm extends from the engaging surface of the clip between the opposing ends of the clip. The width and location of the third arm on each clip is selected to provide a suitable distance between directly opposing arms that is slightly larger than the thickness of an optical element to be secured between the directly opposing arms. Thus, each clip 226 effectively secures dual optical elements to a single flexure blade 230 within frame 200. It is further noted that the clips may be designed in any manner, with appropriate spacing and positioning of the clip arms with respect to each other, to provide a selected spacing as well as a selected vertical and/or horizontal alignment between optical elements secured to the clips.

Another alternative embodiment of the mount design is illustrated in FIGS. 9 and 10. This mount is substantially similar to the mount described above and illustrated in FIGS. 2–7. However, the mount design of FIG. 9 is further configured to receive two separate optical components independently secured to the frame with different pairs of flexure blades. Specifically, the mount includes a frame 300 having two sets of opposing pairs of flexure blades 330 arranged along the upper, lower and side flat portions of the exterior side surface of the frame, with clips 326 disposed on the interior side surface of the frame and secured to the flexure blades with fasteners 339 in a substantially similar manner as frame 100 described above. Each set of flexure blade pairs is suitably aligned on the exterior side surface of frame 300 to allow an optical component 341 or 342 to be secured to the flexure blades of that set. Each set of flexure blades may also be aligned to secure the optical components 341, 342 in any parallel or non-parallel spatial orientation with respect to each other.

One feature of the mount design of FIGS. 9 and 10 is that any distortion forces acting on one optical component will not affect the other optical component since each component is independently secured to the frame with different pairs of flexure blades. Thus, optical components having different coefficients of thermal expansion and subject to different degrees of thermal distortion may be utilized with this mount design while maintaining a desired alignment and flatness of the optical components within an instrument.

Figure 11:
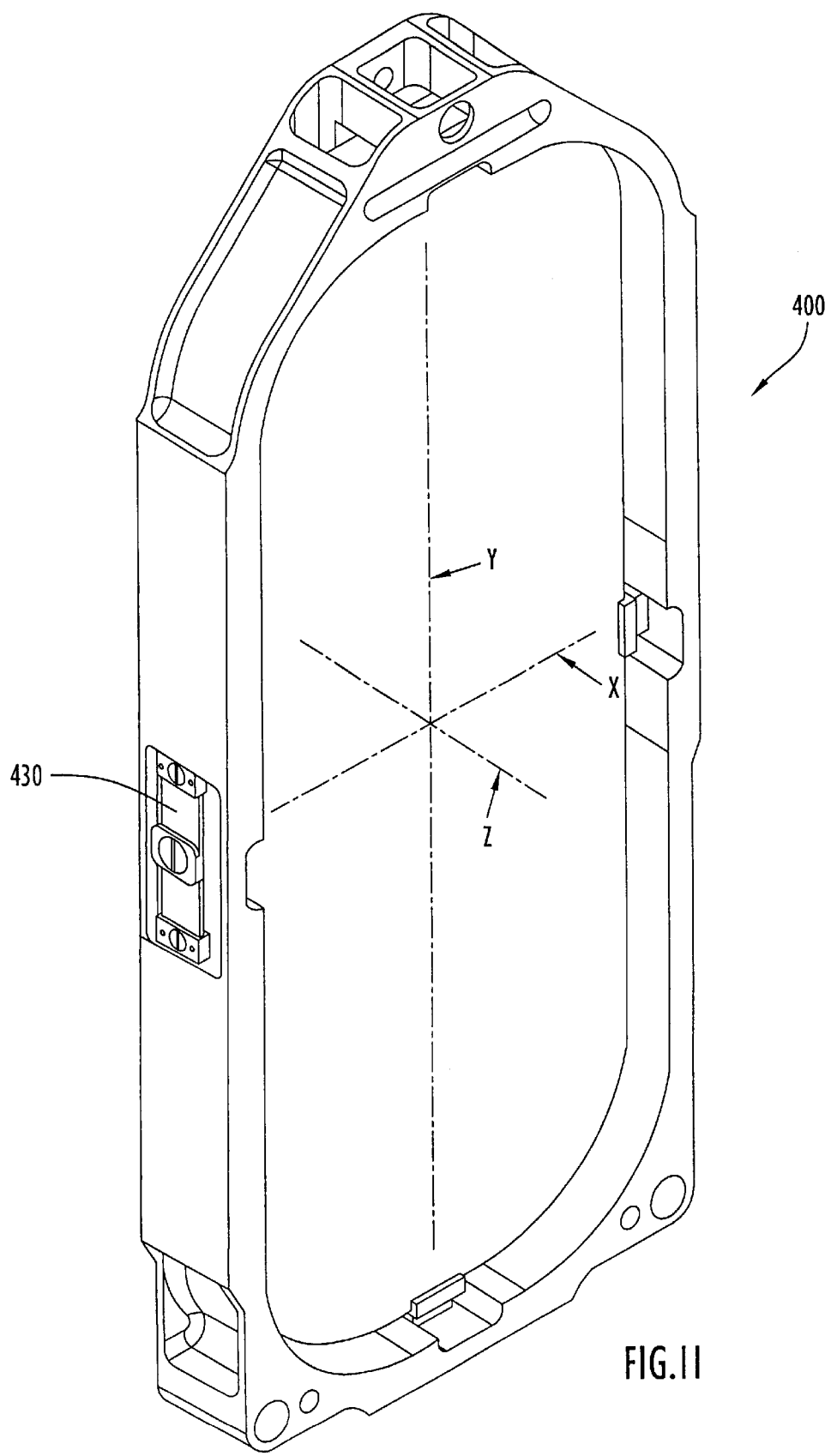
FIG. 11 is a view in perspective of yet another alternative embodiment of a mount with an optical component secured within the mount in accordance with certain aspects of the present invention.

It is noted that other mount designs are contemplated by the present invention that secure optical components of varying sizes and geometric configurations. For example, FIG. 11 illustrates another embodiment of a mount for securing an optical component having significantly elongated directions along a major axis of the optical component in comparison to the previously described embodiments. Frame 400 of the mount is substantially similar to frame 100 described above with the exception that the frame is elongated to receive and retain elongated optical component 440. Additionally, pairs of flexure blades 430 are aligned with and secured to the frame in a substantially similar manner as flexure blades 130 described above to establish a stationary point at the center of the optical component (i.e., the point located at the intersection of the X and Y axes in FIG. 11). Thus, elongation of the optical component as illustrated in FIG. 11 will not significantly affect the performance of a corresponding mount in maintaining the desired flatness of the optical component despite exposure to extreme vibrational and thermal distortion conditions.

It will be appreciated that the embodiments described above and illustrated in the drawings represent only a few of the many ways of implementing a mount for ultra-high performance of an optical component under thermal and vibrational distortion conditions in accordance with the present invention. For example, mounts may be provided that secure circular optical components or multi-sided optical components of any geometric configuration. Additionally, while the flexure blades of the previous embodiments are described as being secured to an exterior surface of the frame, the flexure blades may alternatively be secured to an interior surface or at any other suitable location on the frame that will establish a stationary point at about the center of the optical component mounted within the frame.

The mount of the present invention may further be utilized to support any component that must be stabilized and prevented from undergoing any significant distortion when exposed to extreme vibrational and/or thermal conditions. For example, the mount has applications for supporting optical or other components in the semiconductor manufacturing and related industries.

Having described preferred embodiments of a mount for achieving ultra-high performance of optical components under severe thermal and vibrational distortion conditions, variations and changes will be suggested to those skilled in the art in view of the teachings set forth herein. It is therefore to be understood that all such variations, modifications and changes are believed to fall within the scope of the present invention as defined by the appended claims.

What is claimed:
1. A mount for a component comprising:
   a first pair of supports each disposed along a first axis intersecting a center of the component, wherein the supports of the first pair couple with the component and are flexible in a direction of the first axis; and
   a second pair of supports each disposed along a second axis intersecting the center of the component, wherein the supports of the second pair couple with the component and are flexible in a direction of the second axis.
2. The mount of claim 1, wherein the component is an optical component.
3. The mount of claim 2, wherein the center of the optical component is an optical center of the optical component.
4. The mount of claim 2, wherein the supports of the first pair are substantially rigid in directions non-parallel to the first axis, and the supports of the second pair are substantially rigid in directions non-parallel to the second axis.
5. The mount of claim 2, wherein the first axis is substantially perpendicular to the second axis.

6. The mount of claim 2, further comprising:
   a frame including an interior surface and an exterior surface, wherein the supports of the first and second pairs are disposed on the exterior surface of the frame and the optical component is mountable at the interior surface of the frame.
7. The mount of claim 2, wherein each of the supports of the first and second pairs includes a resilient flexure member that is flexible in the direction of a corresponding one of the first and second axes, and an engaging member disposed along a corresponding one of the first and second axes, wherein each engaging member secures an edge of the optical component to a corresponding flexure member.
8. The mount of claim 7, wherein the optical component includes a plurality of optical elements, and the engaging member of each of the supports of the first and second pairs includes a plurality of engaging sections, each engaging section securing to an edge of a corresponding optical element.
9. The mount of claim 2, further comprising:
   a third pair of supports each disposed along a third axis intersecting a center of a second optical component, wherein the supports of the third pair couple with the second optical component and are flexible in a direction of the third axis; and
   a fourth pair of supports each disposed along a fourth axis intersecting the center of the second optical component, wherein the supports of the fourth pair couple with the second optical component and are flexible in a direction of the fourth axis.
10. The mount of claim 9, further comprising:
    a frame including an interior surface and an exterior surface, wherein the flexures of the first, second, third and fourth pairs are disposed on the exterior surface of the frame and the optical component is mountable at the interior surface of the frame.
11. The mount of claim 2, wherein the mount is secured within an optical instrument.
12. A method of mounting a component, comprising:
    coupling the component to a first pair of supports disposed along a first axis intersecting a center of the component, wherein the supports of the first pair are flexible in a direction of the first axis; and
    coupling the component to a second pair of supports disposed along a second axis intersecting the center of the component, wherein the supports of the second pair are flexible in a direction of the second axis.
13. The method of claim 12, wherein the component is an optical component.
14. The method of claim 13, wherein the center of the optical component is an optical center of the optical component.
15. The method of claim 13, wherein the supports of the first pair are substantially rigid in directions non-parallel the first axis, and the supports of the second pair are substantially rigid in directions non-parallel the second axis.
16. The method of claim 13, wherein the first axis is substantially perpendicular to the second axis.
17. The method of claim 13, further comprising:
    securing the first and second pairs of supports to an exterior surface of a frame, wherein, upon coupling the optical component to the supports of the first and second pairs, the optical component is mounted within an interior surface of the frame.
18. The method of claim 17, further comprising:
    securing the frame within an optical instrument.

19. The method of claim 13, wherein each of the supports of the first and second pairs includes a resilient flexure member that is flexible in the direction of a corresponding one of the first and second axes and an engaging member disposed along a corresponding one of the first and second axes, and the optical component is coupled to each of the supports of the first and second pairs by securing each engaging member of the first and second pairs to a corresponding edge of the optical component.

20. The method of claim 19, wherein the optical component includes a plurality of optical elements, the engaging member of each of the supports of the first and second pairs includes a plurality of engaging sections, and the securing each engaging member of the first and second pairs to a corresponding edge of the optical component includes securing each engaging section on each of the supports of the first and second pairs to a corresponding edge of a corresponding optical element.

21. The method of claim 13, further comprising:

coupling a second optical component to a third pair of supports disposed along a third axis intersecting a center of the second optical component, wherein the supports of the third pair are flexible in a direction of the third axis; and coupling the second optical component to a fourth pair of supports disposed along a fourth axis intersecting the center of the second optical component, wherein the supports of the fourth pair are flexible in a direction of the fourth axis.

22. A mount for a component comprising:

a first means for supporting the component, the first means being disposed on and flexible in a direction of a first axis that intersects a center of the component; and a second means for supporting the component, the second means being disposed on and flexible in a direction of a second axis that intersects the center of the component.

23. The mount of claim 22, wherein the first means is substantially rigid in directions non-parallel the first axis, and the second means is substantially rigid in directions non-parallel the second axis.

24. The mount of claim 22, wherein the first axis is substantially perpendicular to the second axis.

* * * * *